(12) United States Patent
Kawano et al.

(10) Patent No.: US 7,643,708 B2
(45) Date of Patent: Jan. 5, 2010

(54) OPTICAL MODULATOR

(75) Inventors: Kenji Kawano, Atsugi (JP); Masaya Nanami, Zama (JP); Yuji Sato, Atsugi (JP); Seiji Uchida, Atsugi (JP); Nobuhiro Igarashi, Sagamihara (JP); Toru Nakahira, Atsugi (JP); Hiroaki Senda, Isehara (JP)

(73) Assignee: Anritsu Corporation, Atsugi-shi (JP)

( * ) Notice: Subject to any disclaimer, the term of this patent is extended or adjusted under 35 U.S.C. 154(b) by 67 days.

(21) Appl. No.: 11/988,199

(22) PCT Filed: Jul. 5, 2006

(86) PCT No.: PCT/JP2006/313385

§ 371 (c)(1),
(2), (4) Date: Jan. 2, 2008

(87) PCT Pub. No.: WO2007/007604

PCT Pub. Date: Jan. 18, 2007

(65) Prior Publication Data

US 2009/0041403 A1 Feb. 12, 2009

(30) Foreign Application Priority Data

Jul. 7, 2005 (JP) .............................. 2005-198755

(51) Int. Cl.
*G02F 1/035* (2006.01)
(52) U.S. Cl. ............................................. 385/3; 385/2
(58) Field of Classification Search .................. 385/3
See application file for complete search history.

(56) References Cited

U.S. PATENT DOCUMENTS 4,871,223 A 10/1989 Auracher et al.
5,199,086 A * 3/1993 Johnson et al. ................. 385/2
5,309,532 A * 5/1994 Chang et al. .................... 385/3
5,359,449 A * 10/1994 Nishimoto et al. ........... 398/198
6,961,166 B2 * 11/2005 Wooten et al. ............... 359/245
7,340,114 B2 * 3/2008 Doi et al. ........................ 385/2

FOREIGN PATENT DOCUMENTS

| JP | A 8-166565 | 6/1996 |
| JP | A 2000-28979 | 1/2000 |
| JP | A 2000-275590 | 10/2000 |

\* cited by examiner

*Primary Examiner*—Charlie Peng
(74) *Attorney, Agent, or Firm*—Greer, Burns & Crain, Ltd.

(57) ABSTRACT

Herein disclosed is an optical modulator, comprising: a substrate (1) having an electro-optic effect; an optical waveguide (3) formed in the substrate; a traveling wave electrode (4) including a center electrode (4a) and ground electrodes (4b, 4c) to have a high frequency electric signal applied thereto, the traveling wave electrode and the optical waveguide collectively forming a high frequency interaction portion (20) to have the incident light phase modulated under the condition that the high frequency electric signal is applied to the traveling wave electrode; and bias electrodes each including a center electrode (22a, 23a) and ground electrodes (22b, 22c, 23b, 23c) to have a bias voltage applied thereto, each of the bias electrodes and the optical waveguide collectively forming a bias voltage interaction portion (19, 21) to have the incident light phase modulated under the condition that the bias voltage is applied to the bias electrode, in which the traveling wave electrode and the bias electrodes are extended in a propagation direction of the incident light with the traveling wave electrode (20) positioned between the bias electrodes (19, 21).

6 Claims, 9 Drawing Sheets

PRIOR ART

Fig.4

PRIOR ART

Fig.5

PRIOR ART

Fig.6

PRIOR ART

Fig.7

PRIOR ART

Fig.8

PRIOR ART

Fig.9

PRIOR ART

OPTICAL MODULATOR

TECHNICAL FIELD OF THE INVENTION

The present invention relates to an optical modulator with high modulation speed, low driving and DC bias voltages, and high process yield.

DESCRIPTION OF THE RELATED ART

Up until now, there has been developed an optical modulator such as a traveling wave electrode type of lithium niobate optical modulator (hereinafter simply referred to as an LN optical modulator) comprising a substrate (hereinafter simply referred to as an LN substrate) made of a material such as lithium niobate ($LiNbO_3$) having an electro-optic effect to cause a refractive index of an incident light to be varied in response to an electric field applied to the substrate, thereby making it possible to form an optical waveguide and a traveling wave electrode in and on the substrate. The LN optical modulator can be applied to a large volume optical transmission system having a capacity in the range of 2.5 Gbit/s to 10 Gbit/s due to the excellent chirping characteristics. In recent years, the LN optical modulator thus constructed is under review to be applied to the optical transmission system having a super large capacity of 40 Gbit/s and therefore expected as a key device in this technological field.

First Prior Art

Figure 3:
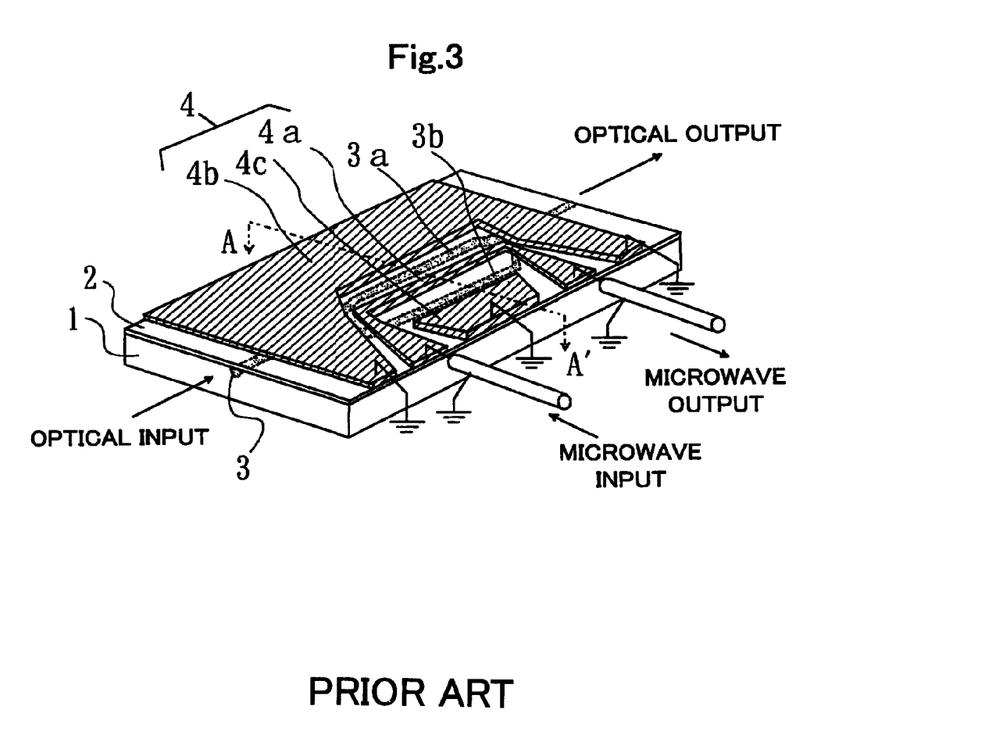
FIG. 3 is a perspective view according to the first prior art.
Figure 4:
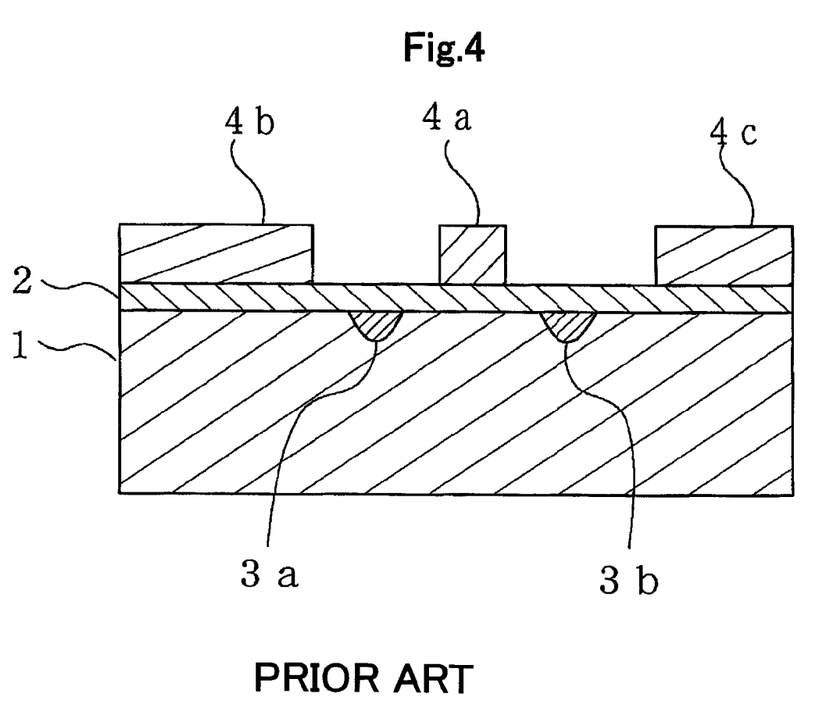
FIG. 4 is a sectional view taken along the line A-A' of FIG. 3.

There are two types of LN optical modulators with respect to the states of the substrate, one substrate having a z-cut state, and the other having an x-cut state (or a y-cut state). Here, x-cut LN substrate type LN optical modulator will be described as the first prior art, wherein the LN optical modulator comprises an x-cut LN substrate and a coplanar waveguide (CPW) forming a traveling wave electrode. FIG. 3 is a perspective view showing the x-cut substrate type LN optical modulator. FIG. 4 is a sectional view taken along the line A-A' of FIG. 3. Incidentally, the discussion hereinafter can be applied to the LN optical modulator using the z-cut state substrate.

As shown in FIGS. 3 and 4, the LN optical modulator comprises an x-cut LN substrate 1, an $SiO_2$ buffer layer 2 having a thickness in the range of approximately 200 nm to 1 μm and being transparent to incident light having wavelength typically utilized for optical communications such as for example 1.3 or 1.55 μm, and an optical waveguide 3 forming a Mach-Zehnder interferometer (a Mach-Zehnder optical waveguide), the optical waveguide 3 being formed with a process of evaporating a metal Ti (titanium) on the x-cut LN substrate 1, and a process of thermal diffusing for 10 hours at 1050° C. The optical waveguide 3 includes two interaction optical waveguides, that is, two arms 3a and 3b at the position (the position will be referred to as an interaction portion) where an electric signal and an incident light are interacted with each other. The CPW traveling wave electrode 4 is constituted by a center electrode 4a and ground electrodes 4b and 4c.

In this first prior art, both a bias voltage (generally a DC bias voltage) and a high frequency electric signal (an RF electric signal) are superimposed and applied between the center electrode 4a and the ground electrodes 4b and 4c, thereby resulting in the fact that the incident light is phase modulated not only by the RF electric signal but also by the DC bias voltage at each of the interaction optical waveguides. The buffer layer 2 is important in that it functions to expand a modulation bandwidth of the optical modulator by reducing a microwave equivalent refractive index $n_m$ of the electric signal traveling through the traveling wave electrode 4 to be close to an equivalent refractive index $n_0$ of the incident lights traveling through the respective interaction optical waveguides 3a and 3b.

The operation of the LN optical modulator thus constructed will be described hereinafter. Firstly, the DC bias voltage and the RF electric signal are necessary to be applied between the center electrode 4a and the ground electrodes 4b and 4c to realize the operation of the LN optical modulator.

Figure 5:
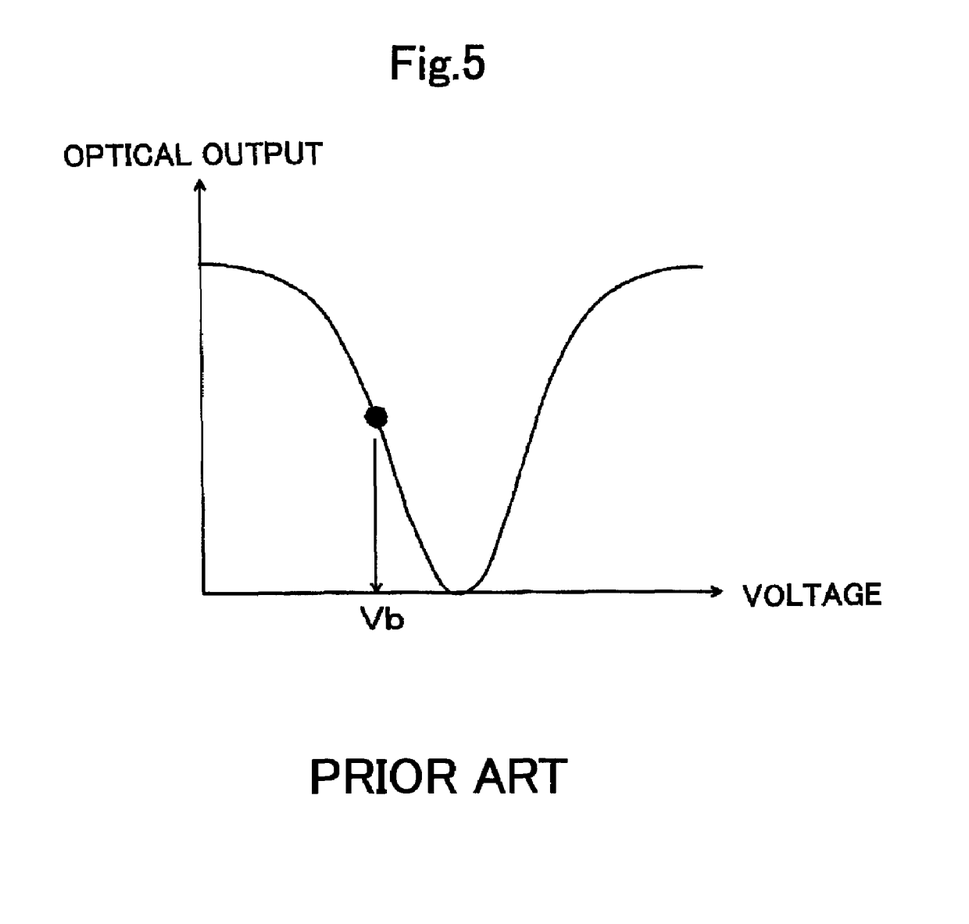
FIG. 5 is a graph to explain the operation of the optical modulator according to the first prior art.

FIG. 5 is a graph showing the relationship between the applied voltage and the output light power of the LN optical modulator under a certain condition with the DC bias voltage set at "Vb". As shown in FIG. 5, the DC bias voltage "Vb" is generally set such that the output light power becomes middle value of the peak-to-peak value.

Figure 6:
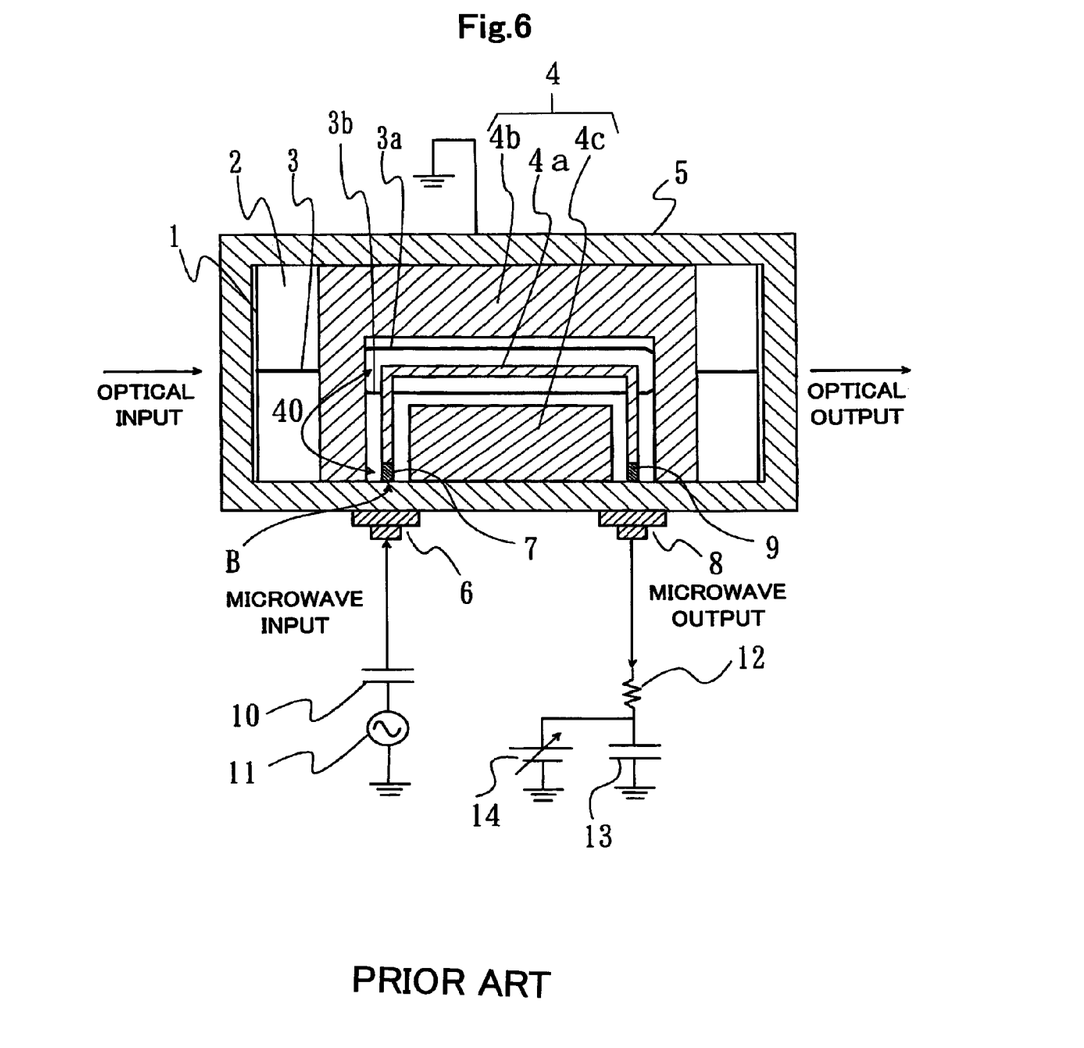
FIG. 6 is a schematic view showing one form of detailed implementation and electric connections according to the first prior art.

FIG. 6 is a schematic view particularly showing one form of implementation and electric connections according to the first prior art. The implemented LN optical modulator comprises a housing 5 formed by a metal, an input connector 6 to input the microwave, i.e., the RF electric signal into the LN optical modulator from an external electric circuit, a connector core 7 partly forming the input connector 6, an output connector 8 to output the RF electric signal from the LN optical modulator, and a connector core 9 partly forming the output connector 8. The implemented LN optical modulator further comprises an electric signal source 11, a capacitor 10 embedded in the electric signal source 11 to eliminate a DC component, an electric termination 12, an additional capacitor 13 to eliminate a DC component, and a DC electric source 14 to apply a DC voltage to the LN optical modulator. The two capacitors 10 and 13 are adapted to block the flow of DC current from the DC electric source 14.

In general, the electric termination 12 and the capacitor 13 are embedded in the housing 5 while the DC bias voltage from the DC electric source 14 is applied through a pin or a wire having a simple construction in order to have the implemented LN optical modulator small in size with low cost.

There are important matters to be described. The LN optical modulator is embedded in a transceiving apparatus, that is, a transponder together with a variety of equipments under the condition that the LN optical modulator and the equipments are positioned in accordance with the predetermined relative positions with each other. In other words, the position of the input connector 6 to input the RF electric signal into the LN optical modulator is determined not randomly but uniquely relative to the housing 5. In addition, the position of the x-cut LN substrate 1 relative to the housing 5 is uniquely determined.

The position of the connector core 7 of the input connector 6 for the RF electric signal is, therefore, uniquely determined at a place of the x-cut LN substrate 1 represented by the legend "B" in FIG. 6.

Figure 7:
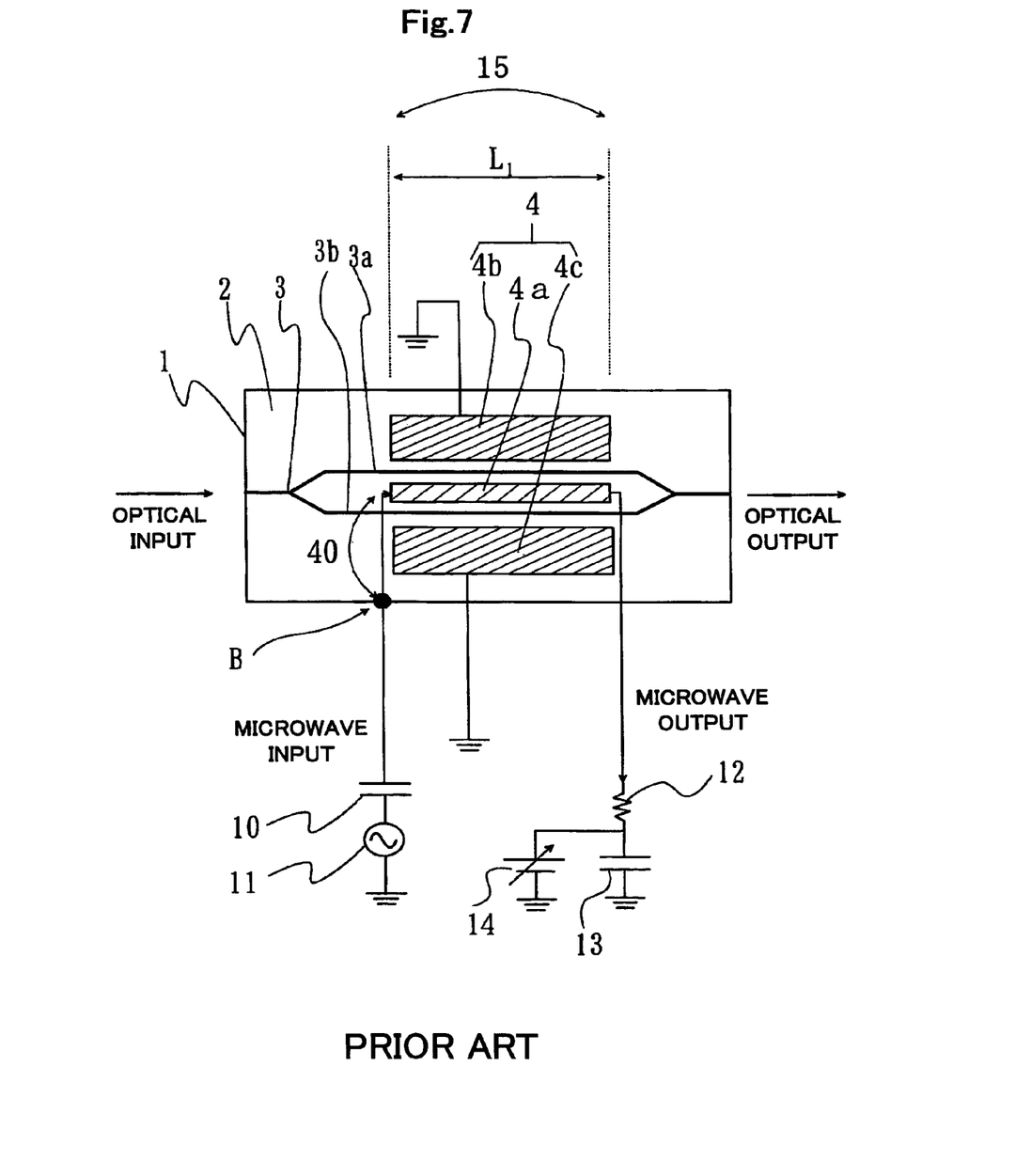
FIG. 7 is a top view schematically showing the optical modulator according to the first prior art.

FIG. 7 is a top view schematically showing the LN optical modulator according to the first prior art. As aforementioned, it is the position "B" in FIG. 7 that the connector core 7 of the input connector 6 to input the RF electric signal is fixed, the position "B" being uniquely determined. Accordingly, the length L1 of the interaction portion 15 where the RF electric signal traveling the center electrode 4a and the ground electrodes 4b and 4c of the traveling wave electrode 4 and the DC bias voltage with the incident light are interacted is uniquely determined.

Here, there is an electrode 40 shown in FIGS. 6 and 7 formed between the position "B" of the connector core 7 of the input connector 6 to input the RF electric signal and the interaction portion to interact the incident light with the RF electric signal (the electrode 40 will be referred to as a feed-through portion), the feed-through portion being placed in a direction perpendicular to the longitudinal direction of the x-cut LN substrate 1 to prevent the RF electric signal from being reflected. This results in the fact that the two interaction optical waveguides 3a and 3b of the optical waveguide 3 are impossible to have the incident light phase-modulated when the incident light is passing through a region between the optical input port and the position "B" of the connector core 7.

The LN optical modulator according to the first prior art further comprises an $SiO_2$ buffer layer 2 at the interaction portion 15 having a length of L1 as shown in FIG. 4, part of the DC bias voltage Vb is applied thereon. However, it is well known that the voltage drop at the $SiO_2$ buffer layer 2 causes a DC drift due to the fact that the $SiO_2$ buffer layer 2 has high impedance. This DC drift has a negative influence on the reliability of the LN optical modulator.

Second Prior Art

Figure 8:
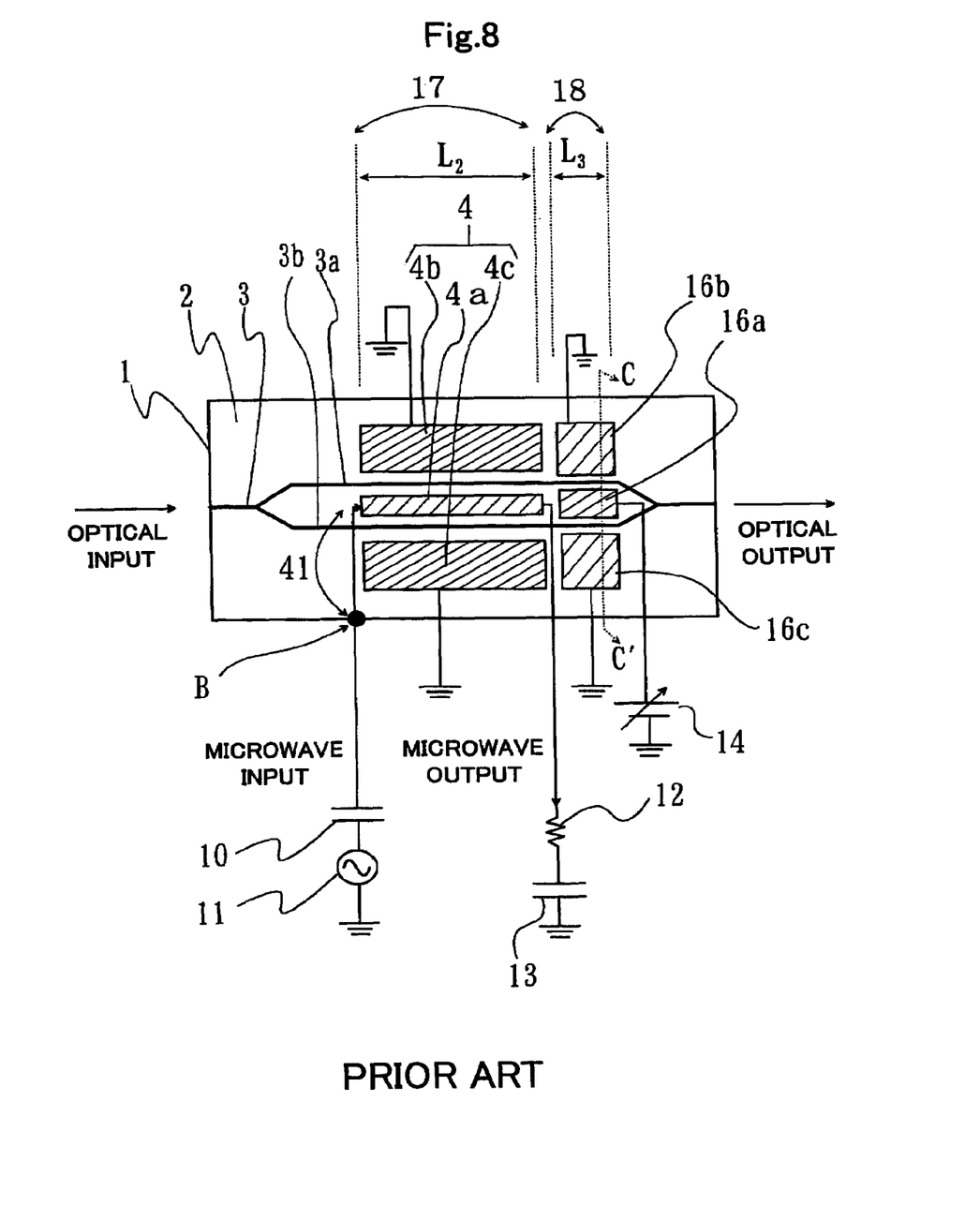
FIG. 8 is a top view schematically showing the optical modulator according to the second prior art.

FIG. 8 is a top view schematically showing the LN optical modulator according to the second prior art, this prior art being raised to solve the problem of the DC drift encountered by the optical modulator according to the first prior art.

Figure 9:
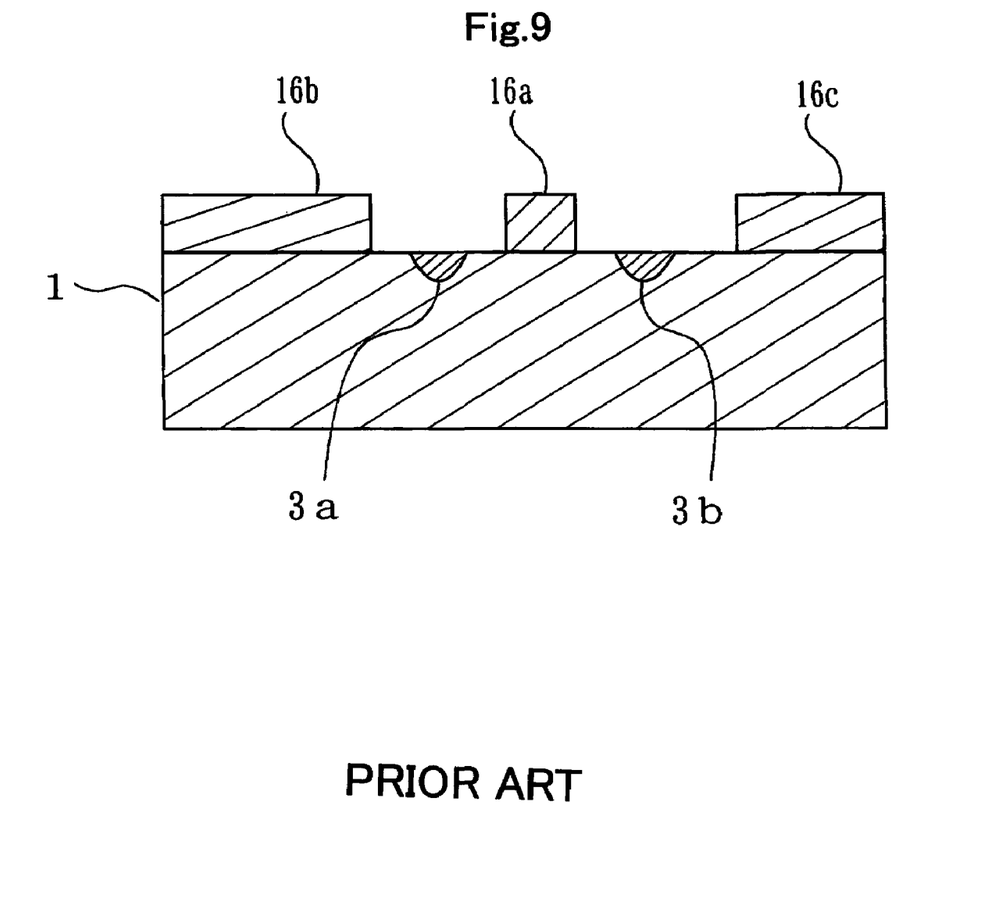
FIG. 9 is a sectional view taken along the line C-C' of FIG. 8.

As described above, the DC drift in the first prior art is caused by the fact that the DC bias voltage is dropped at the $SiO_2$ buffer layer 2 when the DC bias voltage is applied to the $SiO_2$ buffer layer 2. According to the second prior art, the LN optical modulator comprises an RF electric signal interaction portion 17 having a length of L2 to have an RF electric signal applied thereon, a DC bias interaction portion 18 partly constituted by a bias electrode having a length of L3 to have a DC bias voltage applied thereon, the bias electrode including a center electrode 16a and ground electrodes 16b and 16c, enabling that the region to apply the RF electric signal, that is, the RF electric signal interaction portion 17 and the region to apply the DC bias voltage, that is, the DC bias interaction portion 18 are divided with each other. As can be seen in FIG. 9 showing a sectional view taken along the line C-C' of FIG. 8, the $SiO_2$ buffer layer 2 is not formed at the DC bias interaction portion 18, different from the LN optical modulator according to the first prior art shown in FIG. 4.

The LN optical modulator according to the second prior art is, therefore, free from the DC drift caused by the $SiO_2$ buffer layer 2, and this method has been adopted to increase the reliability of the LN optical modulator.

However, the position "B" of the connector core 7 of the input connector 6 (not shown) to input the RF electric signal according to the second prior art shown in FIG. 8 is the same as the position "B" of the LN optical modulator according to the first prior art shown in FIG. 7.

In other words, the length L1 according to the first prior art shown in FIG. 7 is divided into the length L2 of the RF electric signal interaction portion 17 to apply the RF electric signal and the length L3 of the DC bias interaction portion 18 to apply the DC bias voltage, where the length L1 represents the length of the interaction portion 15 to interact the RF electric signal and the DC bias voltage with the incident light. As a result, the length L3 of the DC bias interaction portion 18 to apply the DC bias voltage becomes shorter as the length L2 of the RF electric signal interaction portion 17 to apply the RF electric signal is longer. On the contrary, the length L2 of the RF electric signal interaction portion 17 becomes shorter as the length L3 of the DC bias interaction portion 18 is longer.

As the length L3 of the DC bias interaction portion 18 is shorter, the DC bias voltage applied to the center and the ground electrodes 16a to 16c of the DC bias interaction portion 18 is necessary to be higher. This results in the fact that the DC drift is caused in the LN substrate 1 due to the high electric field intensity in the LN substrate 1.

Meanwhile, the RF driving voltage becomes higher as the length L2 of the RF electric signal interaction portion 17 is shorter. To avoid this problem, the thickness of the $SiO_2$ buffer layer 2 at the RF electric signal interaction portion 17 must be reduced, which results in the LN optical modulator having disadvantages such as velocity mismatching between the RF electric signal and the incident light, and improper characteristic impedance.

In the second prior art, there is an electrode 41 (the portion 41 in FIG. 8) formed between the position "B" of the connector core 7 of the input connector 6 (now shown) to input the RF electric signal and the RF electric signal interaction portion 17 to interact the incident light with the RF electric signal (the electrode 41 will be referred to as a feed-through portion), the feed-through portion being placed in a direction perpendicular to the longitudinal direction of the x-cut LN substrate 1 to prevent the RF electric signal from being reflected. This results in the fact that the two interaction optical waveguides 3a and 3b of the optical waveguide 3 are impossible, even in the second prior art, to have the incident light phase-modulated when the incident light is passing through a region between the optical input port and the position "B" of the connector core 7.

DISCLOSURE OF THE INVENTION

Problems to be Solved by the Invention

As described above, the LN optical modulator according to the first prior art has such a problem that the DC drift is caused by the $SiO_2$ buffer layer due to the fact that the DC bias voltage is applied to the RF electric signal interaction portion where the RF electric signal and the incident light are interacted with each other. On the other hand, the LN optical modulator according to the second prior art, raised to solve the problem encountered by the first prior art, is fabricated such that the DC bias interaction portion, to have the DC bias voltage applied, is formed independently of the RF electric signal interaction portion under the condition that the position of the connector core relative to the LN substrate to input the RF electric signal is predetermined. This results in the fact that the length for RF modulation and DC modulation, that is, the total length of the RF electric signal interaction portion and the DC bias interaction portion is predetermined. Therefore, the length of the DC bias interaction portion or the length of the RF electric signal interaction portion becomes insufficient, thereby resulting in the reliability degradation of the operation caused by the high electric field intensity in the LN substrate or the deterioration of the RF modulation characteristic.

Means for Solving the Problems

It is, therefore, an object of the present invention to provide an LN optical modulator to solve the problems in accordance with the prior art as described above. According to a first aspect of the present invention, there is provided an optical modulator for generating an optical pulse signal, comprising: a substrate having an electro-optic effect; and an optical waveguide formed in the substrate to have an incident light passed therethrough; the optical waveguide partly forming a traveling wave electrode including a center electrode and ground electrodes to have a high frequency electric signal applied thereto, the traveling wave electrode and the optical waveguide collectively forming a high frequency interaction portion to have the incident light phase modulated under the condition that the high frequency electric signal is applied to the traveling wave electrode; and bias electrodes each including a center electrode and ground electrodes to have a bias voltage applied thereto, each of the bias electrodes and the optical waveguide collectively forming a bias voltage interaction portion to have the incident light phase modulated under the condition that the bias voltage is applied to the bias electrode, in which the traveling wave electrode and the bias electrodes are extended in a propagation direction of the incident light with the traveling wave electrode positioned between the bias electrodes.

According to a second aspect of the present invention, there is provided an optical modulator as set forth in claim 1, in which at least two of the center electrodes of the bias electrodes at the bias voltage interaction portion are electrically connected with each other.

According to a third aspect of the present invention, there is provided an optical modulator as set forth in any one of claims 1 and 2, which further comprises a buffer layer positioned below a side edge of the center electrode at the bias voltage interaction portion, the side edge having a extension plane facing the optical waveguide.

Advantageous Effect of the Invention

The optical modulator according to the first aspect of the present invention is provided with an additional DC bias interaction portion on the optical waveguide, the additional DC bias interaction portion being positioned where the incident light has not been phase-modulated by either RF electric signal or DC bias voltage according to the prior art. This results in the fact that the total length of the RF electric signal interaction portion and the DC bias interaction portion becomes longer than that of the optical modulator with separated DC bias interaction portion according to the prior art. The optical modulator according to this invention, therefore, makes it possible to have the lengths of the RF electric signal interaction portion and the DC bias interaction portion longer than those of the optical modulator with the separated DC bias interaction portion according to the prior art, which results in the tremendous improvement in the RF modulation characteristic and the DC drift characteristic. The optical modulator according to the second aspect of the present invention makes it possible to have the DC bias voltage applied thereon with only one DC electric source. The optical modulator according to the third aspect of the present invention makes it possible to lower the DC bias voltages, and to tremendously improve the high process yield due to the fact that the buffer layer is formed with the buffer layer positioned below a side edge of the center electrode at the DC bias interaction portion, the side edge having a extension plane facing the optical waveguide.

DESCRIPTION OF THE REFERENCE NUMERALS

1: x-cut LN substrate (substrate, LN substrate)
2: $SiO_2$ buffer layer (buffer layer)
3: optical waveguide
3a, 3b: interaction optical waveguide (optical waveguide)
4: traveling wave electrode
4a: center electrode
4b, 4c: ground electrode
5: housing
6: input connector for RF electric signal (input connector)
7: connector core of the input connector for RF electric signal (connector core)
8: output connector for RF electric signal (output connector)
9: connector core of the output connector for RF electric signal (connector core)
10: capacitor
11: electric signal source
12: electric termination (termination)
13: capacitor
14: DC electric source
15: interaction portion
16a: center electrode
16b, 16c: ground electrode
17: RF electric signal interaction portion
18: DC bias interaction portion
19: first DC bias interaction portion (interaction portion for bias voltage)
20: RF electric signal interaction portion (interaction portion for high frequency electric signal)
21: second DC bias interaction portion (interaction portion for bias voltage)
22a: center electrode
22b, 22c: ground electrode
23a: center electrode
23b, 23c: ground electrode
24a, 24b, 24c, 24d: $SiO_2$ buffer layer (buffer layer)
B: position of the connector core of the input connector for RF electric signal
40, 41, 42: feed-through portion (portion)

DESCRIPTION OF THE PREFERRED EMBODIMENTS

The embodiments of the optical modulator according to the present invention will now be described in detail. The constitutional elements of the embodiments the same as those of the prior art shown in FIGS. 3 to 9 will not be described but bear the same reference numerals and legends as those of the prior art.

First Embodiment

Figure 1:
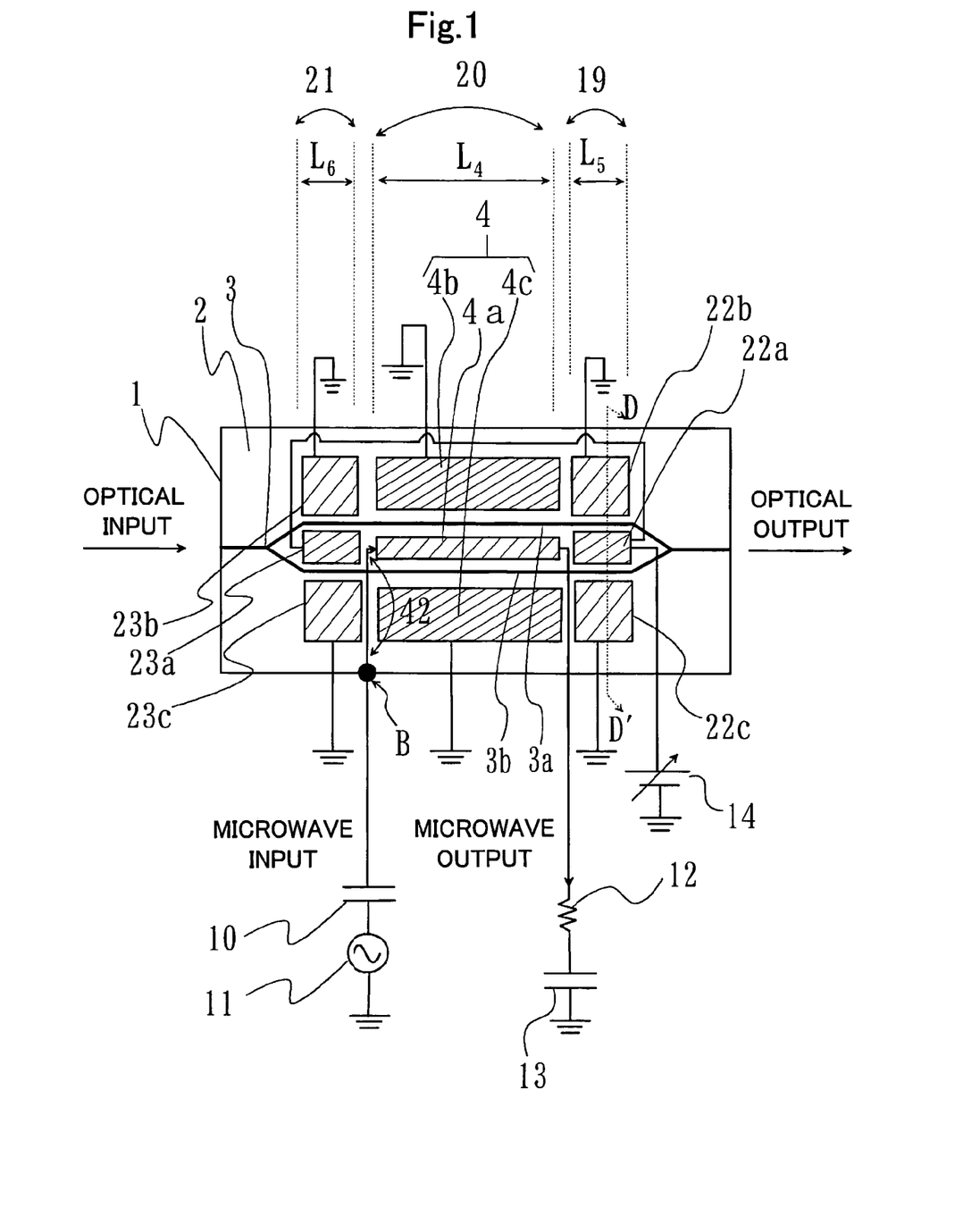
FIG. 1 is a top view schematically showing the optical modulator according to the first embodiment of the present invention.

FIG. 1 is a top view showing the optical modulator according to the first embodiment of the present invention. The optical modulator comprises an RF electric signal interaction portion 20 partly constituted by a center electrode 4a and ground electrodes 4b and 4c having a length of L4 to have an RF electric signal applied thereon, and an interaction portion for bias voltage 19 (hereinafter simply referred to as a first DC bias interaction portion) partly constituted by a center electrode 22a and ground electrodes 22b and 22c having a length of L5 to have a DC bias voltage applied thereon, which is similar to the second prior art shown in FIG. 8. The optical modulator further comprises another interaction portion for bias voltage 21 (hereinafter simply referred to as a second DC bias interaction portion) partly constituted by a center electrode 23a and ground electrodes 23b and 23c having a length of L6 to have a DC bias voltage applied thereon. The sectional view taken along the line D-D' of FIG. 1 is substantially the same as that of FIG. 9. Similarly, the sectional view taken along a line across the second DC bias interaction portion 21 is substantially the same as that of FIG. 9.

It is preferable that the center electrode 22a of the first DC bias interaction portion 19 and the center electrode 23a of the second DC bias interaction portion 21 be electrically connected by the reason that the optical modulator requires only one DC electric source 14 to apply the DC bias voltage. It is preferable that the wiring between the center electrode 22a of the first DC bias interaction portion 19 and the center electrode 23a of the second DC bias interaction portion 21 be formed without passing through gap portions formed by the center electrode 4a and the ground electrodes 4b and 4c of the RF electric signal interaction portion 20.

It is preferable that the ground electrodes 22b, 22c, 23b and 23c be connected to a housing (exemplified by the housing 5 shown in FIG. 6) to ensure the grounding, with the ground electrodes connected with each other or with the respective ground electrodes connected directly to the housing. The roundabout wiring for connecting these electrodes as described above has no effect on the optical modulation characteristics due to the fact that the bias voltage is formed by a DC component or very low frequency component. Here, the optical modulator may have another electric source so that the bias voltage is applied to the center electrodes 22a and 23a from the respective electric sources.

The total length of the RF electric signal interaction portion 17 and the DC bias interaction portion 18 according to the second prior art shown in FIG. 8 is represented by L2+L3. On the other hand, the total length of the RF electric signal interaction portion 20 and the first and the second DC bias interaction portions 19 and 21 according to this invention shown in FIG. 1 is represented by L4+L5+L6, which is much longer compared to the second prior art.

The length L4 of the RF electric signal interaction portion 20 according to this invention, therefore, can be longer than the length L2 of the RF electric signal interaction portion 17 of the second prior art. Simultaneously, the total length L5+L6 of the first and the second DC bias interaction portions 19 and 21 according to this invention can be longer than the length L3 of the DC bias interaction portion 18 according to the second prior art.

As described above, the buffer layer formed under the traveling wave electrode 4 can be thicker as the longitudinal length of the RF electric signal interaction portion becomes longer. Therefore, it is possible to improve the modulation characteristics due to the fact that the velocities of the incident light and the microwave can be close to each other while the characteristic impedance can be close to the impedance of the RF driver. In addition, the DC electric field intensity in the x-cut LN substrate 1 can be lower than that of the optical modulator according to the prior art under the condition that the total longitudinal length of the DC bias interaction portions partly formed by the bias electrode is longer than that of the prior art, which results in reduction in DC drift caused in the x-cut LN substrate 1.

Here, the RF electric signal is not reflected due to the fact that the electrode of the feed-through portion is placed in a direction perpendicular to the longitudinal direction of the x-cut LN substrate 1, in a manner similar to the electrode of the feed through portion according to the first prior art shown in FIGS. 6 and 7 and the second prior art shown in FIG. 8, where the electrode of the feed-through portion (the portion 42 in FIG. 1) to input the RF electric signal is positioned between the position "B" of the connector core 7 of the input connector 6 (not shown in FIG. 1) and the interaction portion to interact the incident light with the RF electric signal. This results in the fact that the modulation characteristics of the LN optical modulator is improved with the DC bias interaction portion formed in the region where it has not been utilized according to the prior art, while the RF electric signal is not reflected in a manner similar to the prior art.

Here, it is necessary to form a buffer layer on the optical waveguide at each of the DC bias interaction portions under the condition that the LN substrate has a z-cut state instead of the x-cut state. In this invention, the DC bias voltage can be set at low compared to that of the prior art due to the fact that the total length of the DC bias interaction portions is longer compared to that of the prior art. In other words, the optical modulator can reduce the DC drift caused not only in the z-cut LN substrate but also in the buffer layer due to the fact that the electric field intensity can be lowered in the buffer layer.

Second Embodiment

As shown in FIG. 1, the center electrode 22a and the ground electrodes 22b and 22c of the first DC bias interaction portion 19, and the center electrode 23a and the ground electrodes 23b and 23c of the second DC bias interaction portion 21 are directly mounted on the x-cut LN substrate 1 according to the first embodiment of the present invention, which is the same as the optical modulator according to the second prior art shown in FIG. 9.

However, the incident light passing through each of the interaction optical waveguides 3a and 3b is absorbed by the center electrode and the ground electrodes in case that the center electrode and the ground electrodes are positioned closely to the interaction optical waveguides due to the fact that the center electrode and the ground electrodes are generally made of a metal gold "Au". This results in the increase of the insertion loss and the deterioration of the extinction ratio.

Figure 2:
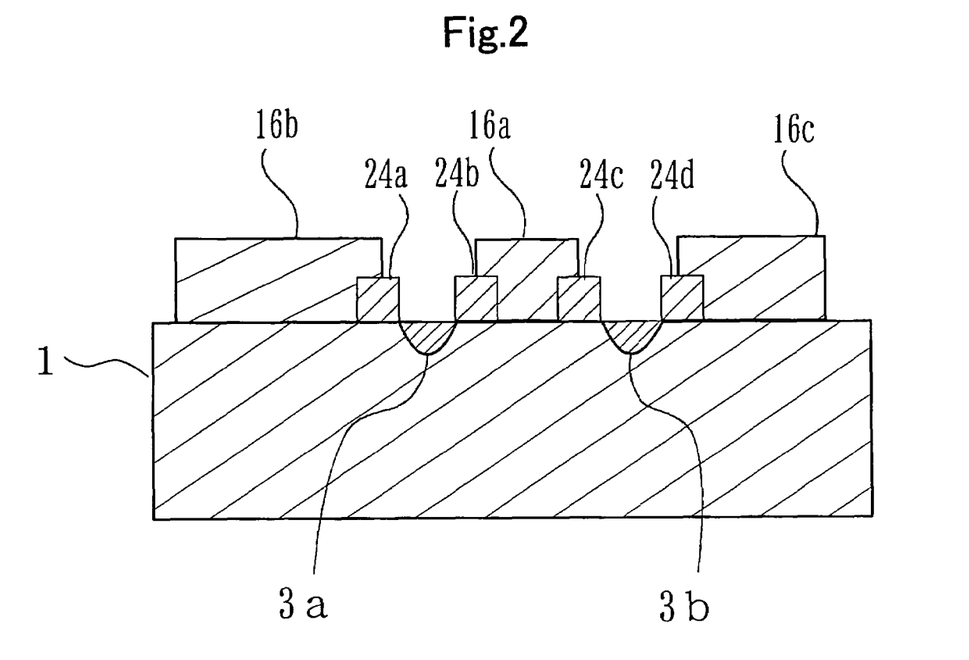
FIG. 2 is a schematic view according to the second embodiment of the present invention.

FIG. 2 is a sectional schematic view showing the first DC bias interaction portion 19 taken along the line D-D' of FIG. 1 according to the second embodiment of the present invention. As shown in FIG. 2, the optical modulator further comprises buffer layers 24a, 24b, 24c and 24d made of $SiO_2$, where part of the center electrode 16a and the ground electrodes 16b and 16c have direct contact with the x-cut LN substrate 1 to be close to the interaction optical waveguides 3a and 3b without increasing the optical absorption loss, which results in lowering the bias voltage.

Here, electric resistance caused by the buffer layer is small enough to neglect in spite of the partial existence of the buffer layer under the condition that the center electrode 16a and the ground electrodes 16b and 16c have direct contact with the x-cut LN substrate 1. (This can be explained, for example, by the fact that the total electric resistance caused by the center electrode 16a and the x-cut LN substrate 1 is determined by the parallel connection of two electric resistances, one electric resistance being determined by the direct connection of the center electrode 16a and the x-cut LN substrate 1, the other electric resistance being determined by the connection of the center electrode 16a, buffer layers 24b and 24c, and the x-cut LN substrate 1, where the former one virtually determines the total electric resistance due to the value of each electric resistance). Therefore, DC drift is not caused by the buffer layers 24a, 24b, 24c and 24d even though the buffer layers 24a, 24b, 24c and 24d are mounted on the x-cut LN substrate 1.

Each Embodiment

There has been described about the fact that the traveling wave electrode is constituted by the CPW electrode, the traveling wave electrode may be constituted by an asymmetric coplanar strip (ACPS), a symmetric coplanar strip (CPS), or the like. Needless to say, the traveling wave electrode may be replaced by an electrode such as a lumped parameter electrode. The Mach-Zehnder optical waveguide may be replaced by any other optical waveguide such as an optical directional coupler and a straight type optical waveguide.

It goes without saying that the width of the center electrode at each of the DC bias interaction portions may be wider than that of the RF electric signal interaction portion, and the width of the gap portions between the center electrode and the ground electrodes at each of the DC bias interaction portions may be narrower than that of the RF electric signal interaction portion. This stems from the fact that the RF electric signal is not applied to the DC bias interaction portions, and thus characteristic impedance is not necessary to be considered.

Furthermore, in each embodiment, the LN substrate may have an x-cut state, a y-cut state, or a z-cut state. In other words, the LN substrate may have a surface direction such that x-axis, y-axis, or z-axis of the crystal is perpendicular to the surface (cut surface) of the LN substrate. The LN substrate may be formed such that the main surface direction, the direction as described above, is mixed with a sub surface direction different from the main surface direction. The LN substrate may be formed with another material having the electro-optic effect such as lithium tantalite and a semiconductor.

Thought there has been described about the fact that one interaction portion for bias voltage is positioned at each side of the RF electric signal interaction portion along the light propagation direction, there may be a plurality of interaction portions for bias voltage at one side or each side of the RF electric signal interaction portion.

INDUSTRIAL APPLICABILITY OF THE PRESENT INVENTION

In accordance with the present invention, there is provided an optical modulator which can tremendously improve the RF modulation characteristics and the DC drift characteristics, being available for an optical modulator with high modulation speed, low driving and DC bias voltages, and high process yield.

What is claimed is:

1. An optical modulator for generating an optical pulse signal, comprising:
   a substrate having an electro-optic effect; and
   an optical waveguide formed in said substrate to have an incident light passed therethrough,
   said optical waveguide partly forming
   a traveling wave electrode including a first center electrode and first ground electrodes to have a high frequency electric signal applied thereto, said traveling wave electrode and said optical waveguide collectively forming a high frequency interaction portion to have said incident light phase modulated under the condition that said high frequency electric signal is applied to said traveling wave electrode, and
   bias electrodes each including a second center electrode and second ground electrodes to have a bias voltage applied thereto, each of said bias electrodes and said optical waveguide collectively forming a bias voltage interaction portion to have said incident light phase modulated under the condition that said bias voltage is applied to said bias electrode, in which
   said traveling wave electrode and said bias electrodes are extended in a propagation direction of said incident light with said traveling wave electrode positioned between said bias electrodes,
   the second center electrodes of said bias electrodes are electrically connected with each other on said substrate, ensuring that the bias voltage is applied to said second center electrodes from one bias electric source.

2. An optical modulator as set forth in claim 1, which further comprises
   a buffer layer positioned below a side edge of said second center electrode at said bias voltage interaction portion, said side edge having an extension plane facing said optical waveguide.

3. An optical modulator as set forth in claim 1, wherein
   one of said bias electrodes is positioned to be closer to an optical input port of said substrate than a portion where a connector core for inputting the high frequency electric signal to said first center electrode is located.

4. An optical modulator as set forth in claim 3, wherein
   the bias voltage is applied to aid second center electrodes from a portion closer to an optical output portion than a portion where said connector core for inputting the high frequency electric signal to said first center electrode is located.

5. An optical modulator as set forth in claim 2, wherein
   one of said bias electrodes is positioned to be closer to an optical input port of said substrate than a portion where a connector core for inputting the high frequency electric signal to said first center electrode is located.

6. An optical modulator as set forth in claim 5, wherein
   the bias voltage is applied to said second center electrodes from a portion closer to an optical output portion than a portion where said connector core for inputting the high frequency electric signal to said first center electrode is located.

* * * * *